(12) United States Patent
Navarrete et al.

(10) Patent No.: US 12,076,757 B2
(45) Date of Patent: Sep. 3, 2024

(54) ROLLER-BELT SORTER WITH BOOSTER

(71) Applicant: Laitram, L.L.C., Harahan, LA (US)

(72) Inventors: Benjamin F. Navarrete, Montrose, CO (US); Ken C. Coffey, Candler, NC (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 18/024,808

(22) PCT Filed: Aug. 26, 2021

(86) PCT No.: PCT/US2021/047714
§ 371 (c)(1),
(2) Date: Mar. 6, 2023

(87) PCT Pub. No.: WO2022/072086
PCT Pub. Date: Apr. 7, 2022

(65) Prior Publication Data
US 2023/0338991 A1    Oct. 26, 2023

Related U.S. Application Data

(60) Provisional application No. 63/085,210, filed on Sep. 30, 2020.

(51) Int. Cl.
*B07C 5/36*     (2006.01)
*B65G 13/02*    (2006.01)
(Continued)

(52) U.S. Cl.
CPC .............. *B07C 5/36* (2013.01); *B65G 47/525* (2013.01); *B65G 47/54* (2013.01)

(58) Field of Classification Search
CPC ........ B07C 5/36; B65G 47/525; B65G 47/53; B65G 47/54; B65G 2811/0652
(Continued)

(56) References Cited

U.S. PATENT DOCUMENTS 5,088,596 A * 2/1992 Agnoff ................. B65G 13/073
                                                    198/788
6,148,990 A * 11/2000 Lapeyre ................ B65G 17/40
                                                    198/779

(Continued)

FOREIGN PATENT DOCUMENTS

DE       10117553 A1    10/2002
EP       0438667 A2 *  11/1990  ............... B07C 5/36
(Continued)

*Primary Examiner* — Michael McCullough
*Assistant Examiner* — Molly K Devine
(74) *Attorney, Agent, or Firm* — James T. Cronvich

(57) ABSTRACT

A sorting conveyor system (46) comprising a main conveyor line (48) intersected by cross conveyors (18) having roller-top conveyor belts (20). The roller-top conveyor belts, which can be driven bidirectionally perpendicular to the conveying direction of the main conveyor line, have article-supporting belt rollers (22) that can rotate freely in the main conveying direction (14). Articles (38) fed from the main conveying line onto the cross conveyor can be sorted to the left or the right by the conveyor belt. Articles destined for sorting downstream pass over the stopped roller-top conveyor belt atop the freely rotatable belt rollers and back onto the main conveyor line. A booster (40), such as a motorized roller (40), between the main conveyor line and the cross conveyor applies a force in the main conveying direction against articles destined to cross the cross conveyor.

22 Claims, 2 Drawing Sheets

(51) Int. Cl.
*B65G 13/10* (2006.01)
*B65G 17/40* (2006.01)
*B65G 47/52* (2006.01)
*B65G 47/54* (2006.01)

(58) Field of Classification Search
USPC .......................................................... 209/509
See application file for complete search history.

(56) References Cited

U.S. PATENT DOCUMENTS

| | | | |
|---|---|---|---|
| 6,182,813 B1 | 2/2001 | Bonnet | |
| 6,398,461 B1 * | 6/2002 | Vincent | B65G 51/03 406/79 |
| 7,228,954 B2 | 6/2007 | DePaso | |
| 7,306,086 B2 | 12/2007 | Boelaars | |
| 7,360,638 B2 * | 4/2008 | Ko | H01R 27/00 198/575 |
| 8,701,867 B2 * | 4/2014 | Costanzo | A01K 31/165 198/531 |
| 9,156,629 B2 | 10/2015 | Costanzo et al. | |
| 2006/0070854 A1 | 4/2006 | Boelaars | |
| 2014/0262684 A1 * | 9/2014 | Skanse | B65G 47/54 198/369.6 |
| 2017/0349383 A1 | 12/2017 | Myers et al. | |
| 2018/0002116 A1 | 1/2018 | Gysen et al. | |

FOREIGN PATENT DOCUMENTS

| | | |
|---|---|---|
| GB | 1254866 A | 11/1971 |
| JP | 2012224411 A | 11/2012 |

* cited by examiner

ROLLER-BELT SORTER WITH BOOSTER

BACKGROUND

The invention relates generally to power-driven conveyors and more particularly to sorters using roller-top belts.

In the tire industry finished tires leave the inspection area in a mix of types and sizes. The tires are then sorted to different destinations based on their size and type. This has been achieved by interrupting a main conveyor with one or more cross conveyors. Each cross conveyor includes a bidirectional transverse roller-top belt that can sort to the left or the right by the bidirectionally driven belt or across the belt and back onto the main conveyor for further sorting downstream. One example of such a sorting system is described in U.S. Pat. No. 7,306,086, issued Dec. 11, 2007, to Henk W. M. Boelaars. The conveyor system described in that patent requires the roller-top belt to be raised and lowered depending on the tire's assigned destination. If a tire is to be diverted to the right or the left, the roller-top belt is raised above the level of the main conveyor. The roller-top belt is lowered for a tire that is not to be diverted by the cross conveyor. The momentum of a tire entering the cross conveyor is sufficient to push the tire across the roller-top belt onto the next main-conveyor segment, which can then convey the tire downstream. But if the cross conveyor is much wider than the diameter of a tire, the tire's momentum may not be great enough for the tire to cross the cross conveyor.

SUMMARY

One version of a sorting system comprises an infeed conveyor advancing articles from an entrance to an exit in a first direction, a cross conveyor, and first second, and third destinations for the articles. The cross conveyor includes a roller-top conveyor belt that has a first side and an opposite second side spaced apart in the first direction and a first end and an opposite second end. The roller-top conveyor belt is arranged to travel selectively in a second direction perpendicular to the first direction or in a third direction opposite the second direction. Article-supporting belt rollers in the roller-top belt are freely rotatable in the first direction. The first destination is positioned at the second side of the roller-top conveyor belt opposite the infeed conveyor to receive articles passed atop the belt rollers across the roller-top conveyor belt in the first direction. The second destination is positioned at the first end of the roller-top conveyor belt to receive articles discharged off the first end of the roller-top conveyor belt advancing in the second direction. The third destination is positioned at the second end of the roller-top conveyor belt to receive articles discharged off the second end of the roller-top conveyor belt advancing in the third direction. A booster disposed between the exit of the infeed conveyor and the first side of the cross conveyor is selectively operable to apply a force in the first direction to selected articles exiting the infeed conveyor to push the selected articles across the width of the roller-top conveyor belt to the first destination.

Another version of a sorting conveyor comprises a main conveyor line including a series of main conveyor segments advancing articles in a first direction from an entrance to an exit of each main conveyor segment and a plurality of cross conveyors intersecting the main conveyor line between the main conveyor segments. Each of the cross conveyors includes a roller-top conveyor belt. The roller-top conveyor belt has a first side and an opposite second side spaced apart in the first direction and a first end and an opposite second end. The roller-top conveyor belt is arranged to travel selectively in a second direction perpendicular to the first direction or in a third direction opposite the second direction. Article-supporting belt rollers are freely rotatable in the first direction. First destinations at the first ends of the roller-top conveyor belts receive articles discharged off the first ends of the roller-top conveyor belts advancing in the second direction. Second destinations at the second ends of the roller-top conveyor belts receive articles discharged off the second ends of the roller-top conveyor belt advancing in the third direction. A booster disposed between the exit of each main conveyor segment and the first side of each cross conveyor intersecting the main conveyor line and selectively operable to apply a force in the first direction to selected articles exiting each main conveyor segment to push the selected articles across the width of the roller-top conveyor belt to the entrance of the next main conveyor segment in the main conveyor line.

DETAILED DESCRIPTION

Figure 1:
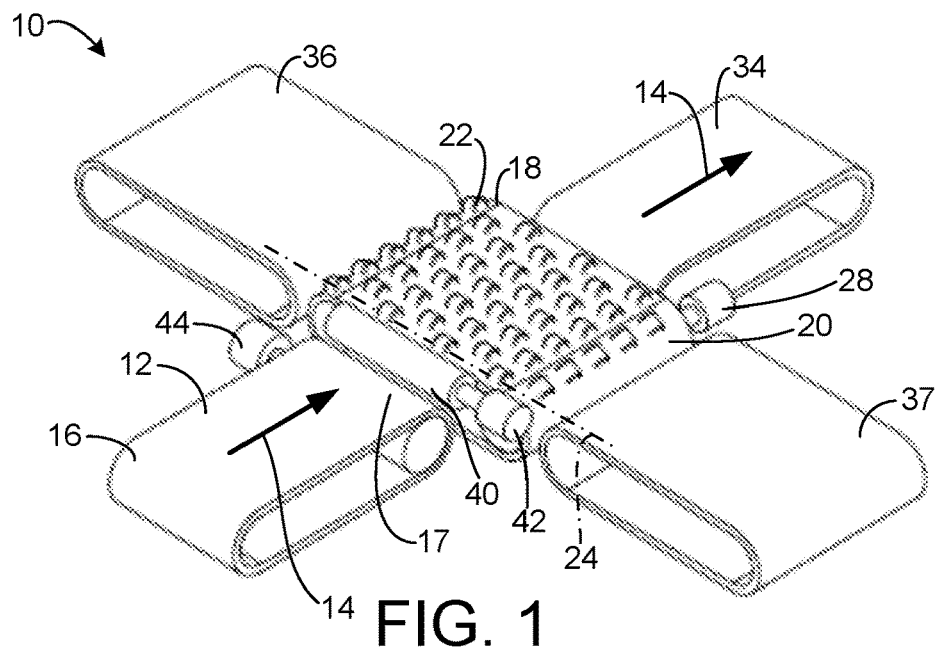
FIG. 1 is an isometric view of a sorting section of a sorting conveyor using a bidirectional roller-top cross-conveyor belt with an assist roller.
Figure 2:
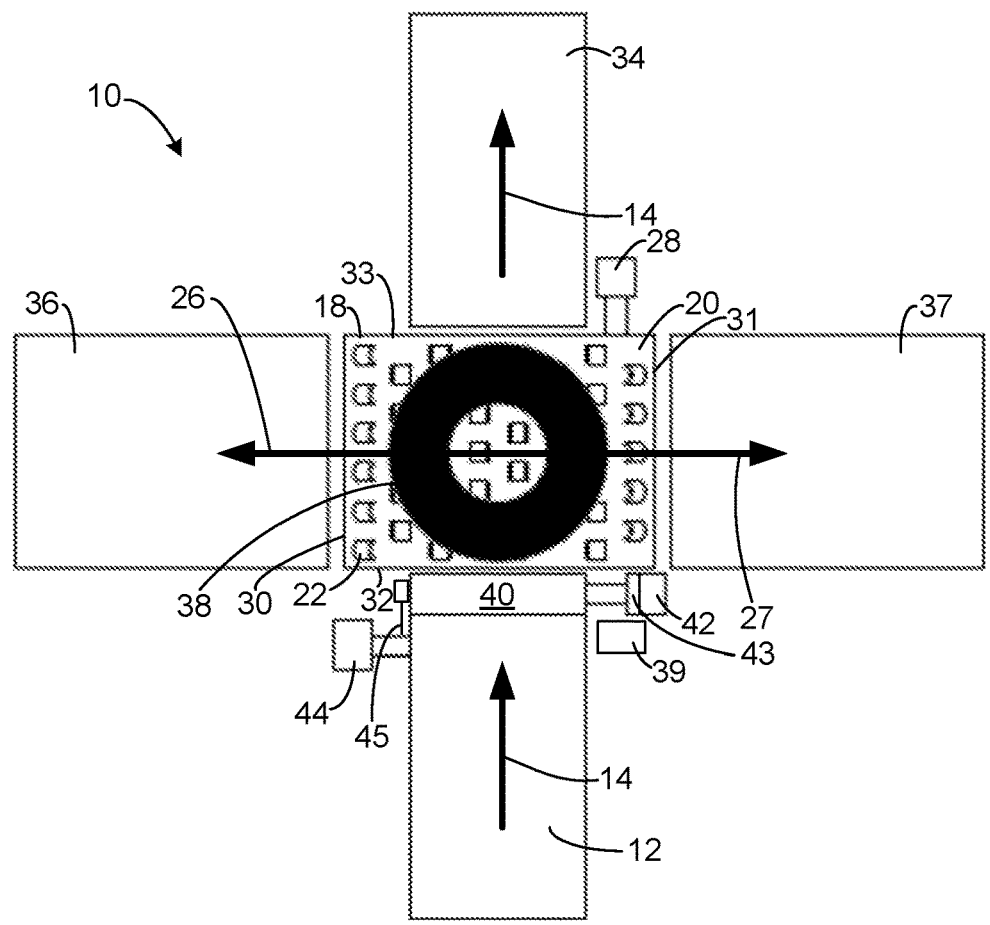
FIG. 2 is a top plan view of the sorting section of the sorting conveyor of FIG. 1.
Figure 3:
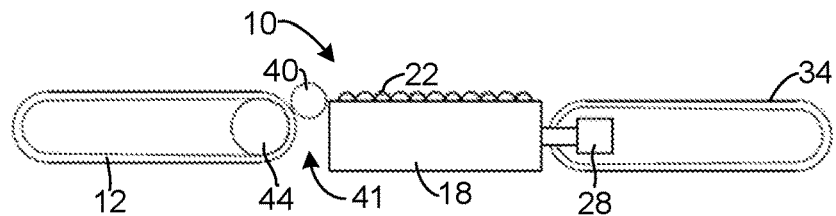
FIG. 3 is a side elevation view of the sorting section of the sorting conveyor of FIG. 1.

A sorting conveyor embodying features of the invention is shown in FIGS. 1-3. The conveyor 10 comprises an infeed conveyor 12, which may be a conveyor belt or a roller conveyor, for example. The infeed conveyor 12 conveys articles, such as tires, in a first conveying direction 14, i.e., in a main conveying direction. The infeed conveyor 12 extends in length in the conveying direction from an entrance 16 to an exit 17. The infeed conveyor 12 feeds articles onto a cross conveyor 18 that includes a roller-top conveyor belt 20, such as an INTRALOX® Series 4400 TRT (transverse roller top) conveyor belt, manufactured and sold by Intralox, L.L.C. of Harahan, Louisiana, U.S.A.

The roller-top conveyor belt 20 has article-supporting rollers 22 on an outer face of the belt. The belt rollers are freely rotatable on axes 24 that are perpendicular to the first conveying direction 14. In that way the belt rollers 22 can rotate freely in the first direction. The roller-top conveyor belt 20 is driven bidirectionally to the left in a second direction 26 and to the right in a third direction 27 by a drive 28 that includes, for example, a motor, a gearbox, a drive shaft, and drive sprockets. The second and third directions 26, 27 are perpendicular to the first conveying direction 14. The roller-top belt 20 extends in length from a first end 30 to an opposite second end 31 and in width from a first side 32 to an opposite second side 33.

The cross conveyor 18 facilitates the sorting of articles received from the infeed conveyor 12 to a selected one of three destinations: (1) straight across the roller-top conveyor belt 20 to an outfeed conveyor 34; (2) left to a left destination 36; or (3) right to a right destination 37. The left and right destinations 36, 37 may be realized as discharge conveyors, chutes, or collection tables, for example. The cross-conveyor drive 28 selectively drives the roller-top conveyor belt to the left destination 36 in the second direction 26 or to the right destination 37 in the third direction 27 depending on the destination assigned to the article. An article not assigned to either the left or the right destination is passed atop the freely rotatable rollers 22 across the roller-top conveyor belt 20 to the outfeed conveyor 34. When an article, such as a tire 38, is destined for the outfeed conveyor 34, the roller-top conveyor belt 20 is stopped. In that way the article can coast over the freely rotatable rollers 22 and onto the outfeed conveyor 34 at the exit 17 of the infeed conveyor 14. A position sensor 39 near the exit 17 detects the presence of an article.

Because the roller-top conveyor belt 20 may be wide or the article may not have enough momentum on exiting the infeed conveyor 12 to cross the cross conveyor 18, a booster in the form of a motorized assist roller 40 is positioned in a gap 41 between the exit 17 of the infeed conveyor and the closer first side 32, the upstream side, of the roller-top conveyor belt. The booster 40 is selectively operable to apply a force in the first direction to selected articles exiting the infeed conveyor 12 to help push them across the width of the cross conveyor 18 and onto the outfeed conveyor 34. The motorized assist roller 40 is driven by a roller drive 42 that is independent of the infeed drive 44 for the infeed conveyor 12. The speed of the motorized assist roller 40 is great enough to ensure that the momentum of an article destined to cross the cross conveyor 18 is sufficient to complete the crossing. If an article is assigned to the left destination 36 or the right destination 37, the speed of the motorized roller 40 can be adjusted to a speed below the speed of the infeed conveyor 12 to decelerate an article so that it does not overshoot the cross conveyor. While an article destined for the left or the right destination 36, 37 is being transferred onto the cross conveyor 18, the roller-top conveyor belt 20 can be stopped or can be moving. As one alternative, the motorized roller's drive 42 can include a clutch 43, which is engaged to propel an article across the cross conveyor and is disengaged for an article exiting the infeed conveyor 12 that is assigned to the left destination 36 or the right destination 37. As another alternative, the motorized assist roller 40 can be slaved to the infeed conveyor's drive 44 by a drive belt or chain 45, a pulley or a sprocket, and a clutch, for example.

Figure 4:
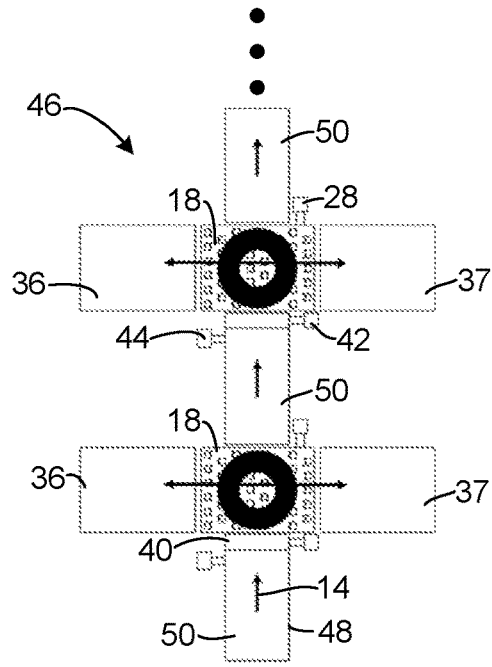
FIG. 4 is a top plan view of a sorting conveyor comprising a series of sorting sections as in FIG. 1.

A longer conveyor system 46 including multiple cross conveyors 18 and sorting destinations is shown in FIG. 4. A main conveyor line 48 includes a series of main conveyor segments 50, such as the infeed and outfeed conveyors 12, 34 of FIGS. 1-3. Like the infeed and outfeed conveyors 12, 34 of FIGS. 1-3, all the main conveyor segments 50 are aligned in the main conveying direction 14. The main conveyor line 48 is intersected by cross conveyors 18 that each provide bilateral sorting destinations 36, 37.

Figure 5:
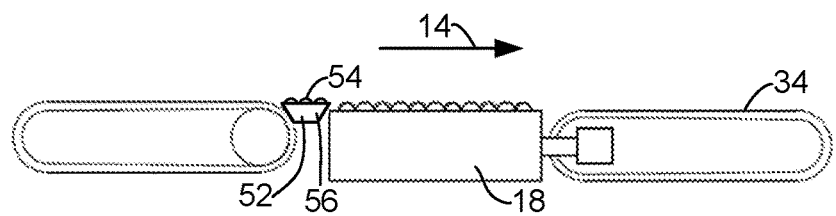
FIG. 5 is a side elevation view of a sorting section as in FIG. 3 but with linear-motor-driven rollers in place of an assist roller.

A different kind of booster is shown in FIG. 5. This booster 52 is realized as a series of smaller diameter rollers 54 that include magnetic or ferrous material. A linear-motor stator 56 under the rollers 54 produces an electromagnetic flux wave that causes the rollers 54 to rotate to push articles in the first conveying direction 14 across the cross conveyor 18 and onto the outfeed conveyor 34. Rollers 54 with magnetic material form linear synchronous motors with the stator 56; rollers with ferrous materials form linear induction motors with the stator.

Figure 6:
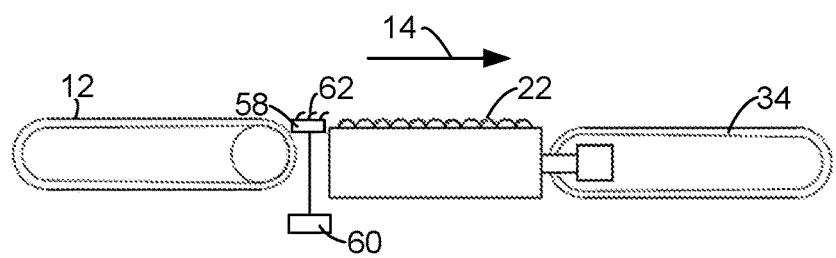
FIG. 6 is a side elevation view of a sorting section as in FIG. 3 but with an air manifold in place of an assist roller.

Another alternative booster is shown in FIG. 6. This booster is realized as an air manifold 58 supplied pressurized air by an air source 60. Outlets in the top of the manifold direct air jets 62 at articles exiting the infeed conveyor 12. The air jets apply a component of force in the first conveying direction 14 to help push selected articles across the belt rollers 22 on the stopped roller-top belt 20 and onto the outfeed conveyor 34.

The speeds of the drives 28 for the cross conveyors 18, the drives 44 for the main conveyor segments 50, and the drives 42 for the boosters 40 are controlled conventionally by a processor (not shown). The position sensors 39 along the length of the conveyor system report the positions of articles to the processor. Identification sensors, such as bar-code readers, also provide the processor with identifying information for each of the articles so that the processor can determine each article's assigned destination and control the sorting system accordingly.

What is claimed is:

1. A sorting system comprising:
   an infeed conveyor advancing articles from an entrance to an exit in a first direction;
   a cross conveyor including a roller-top conveyor belt having:
      a first side and an opposite second side spaced apart in the first direction;
      a first end and an opposite second end;
      wherein the roller-top conveyor belt is arranged to travel selectively in a second direction perpendicular to the first direction or in a third direction opposite the second direction;
      a plurality of article-supporting belt rollers freely rotatable in the first direction;
   a first destination positioned at the second side of the roller-top conveyor belt opposite the infeed conveyor to receive articles passed atop the belt rollers across the roller-top conveyor belt in the first direction;
   a second destination at the first end of the roller-top conveyor belt to receive articles discharged off the first end of the roller-top conveyor belt advancing in the second direction;
   a third destination at the second end of the roller-top conveyor belt to receive articles discharged off the second end of the roller-top conveyor belt advancing in the third direction;
   a booster disposed between the exit of the infeed conveyor and the first side of the cross conveyor and selectively operable to apply sufficient force in the first direction to selected articles exiting the infeed conveyor for the selected articles to coast on the freely rotatable belt rollers across the width of the roller-top conveyor belt to the first destination.

2. The sorting system as claimed in claim 1 wherein the first, second, and third destinations are conveyor belts conveying articles away from the cross conveyor.

3. The sorting system as claimed in claim 1 wherein the booster comprises a motorized assist roller selectively rotated in the first direction to push articles destined for the first destination across the belt rollers on the cross conveyor to the first destination.

4. The sorting system as claimed in claim 3 wherein the speed of the motorized assist roller is adjusted below the speed of the infeed conveyor to decelerate an article destined for the second or third destination being fed onto the roller-top conveyor belt.

5. The sorting system as claimed in claim 3 wherein the speed of the motorized assist roller is configured to ensure that an article crosses the roller-top conveyor belt to the first destination.

6. The sorting system as claimed in claim 3 wherein the infeed conveyor has an infeed drive driving the infeed conveyor and wherein the infeed drive is coupled to the motorized assist roller to drive the motorized assist roller.

7. The sorting system as claimed in claim 3 comprising a drive and a clutch selectively engaging the drive to and disengaging the drive from the motorized assist roller.

8. The sorting system as claimed in claim 1 wherein the booster comprises a series of linear-motor-driven rollers disposed between the exit of the first infeed conveyor and the first side of the cross conveyor and selectively rotated in the first direction to push articles destined for the first destination across the belt rollers on the cross conveyor to the first destination.

9. The sorting system as claimed in claim 1 wherein the booster comprises an air manifold at the exit end of the infeed conveyor having outlets arranged to direct air jets against articles destined for the first destination to push the selected articles across the belt rollers on the cross conveyor to the first destination.

10. The sorting system as claimed in claim 1 wherein the force applied by the booster in the first direction is configured to ensure that an article crosses the roller-top conveyor belt to the first destination.

11. The sorting system as claimed in claim 1 wherein the roller-top conveyor belt is stopped when an article destined for the first destination is crossing the roller-top conveyor belt.

12. The sorting system as claimed in claim 1 wherein the booster does not apply a force in the first direction against an article destined for the second or third destination.

13. A sorting system comprising:
a main conveyor line including a series of main conveyor segments advancing articles in a first direction from an entrance to an exit of each main conveyor segment;
a plurality of cross conveyors intersecting the main conveyor line between the main conveyor segments, wherein each of the cross conveyors includes a roller-top conveyor belt having:
a first side and an opposite second side spaced apart in the first direction;
a first end and an opposite second end;
wherein the roller-top conveyor belt is arranged to travel selectively in a second direction perpendicular to the first direction or in a third direction opposite the second direction;
a plurality of article-supporting belt rollers freely rotatable in the first direction;
first destinations at the first ends of the roller-top conveyor belts to receive articles discharged off the first ends of the roller-top conveyor belts advancing in the second direction;
second destinations at the second ends of the roller-top conveyor belts to receive articles discharged off the second ends of the roller-top conveyor belt advancing in the third direction;
a booster disposed between the exit of each main conveyor segment and the first side of each cross conveyor intersecting the main conveyor line and selectively operable to apply sufficient force in the first direction to selected articles exiting each main conveyor segment for the selected articles to coast on the freely rotatable belt rollers across the width of the roller-top conveyor belt to the entrance of the next main conveyor segment in the main conveyor line.

14. The sorting system as claimed in claim 13 wherein the first and second destinations and the main conveyor segments are conveyor belts conveying articles away from the cross conveyors.

15. The sorting system as claimed in claim 13 wherein the booster comprises a motorized assist roller selectively rotated in the first direction to push articles across the belt rollers on the cross conveyor.

16. The sorting system as claimed in claim 15 wherein the speed of the motorized assist roller is adjusted below the speed of the adjacent main conveyor segment to decelerate an article destined for the first or second destination of the adjacent cross conveyor.

17. The sorting system as claimed in claim 15 wherein the speed of the motorized assist roller is configured to ensure that an article crosses the roller-top conveyor belt.

18. The sorting system as claimed in claim 13 wherein the booster comprises a series of linear-motor-driven rollers disposed between the exit of each main conveyor segment and the first side of the cross conveyor and selectively rotated in the first direction to push articles destined to continue along the main conveyor line across the belt rollers on the cross conveyor.

19. The sorting system as claimed in claim 13 wherein the booster comprises an air manifold at the exit of the main conveyor segment having outlets arranged to direct air jets against articles destined to continue along the main conveyor line to push the selected articles across the belt rollers on the cross conveyor.

20. The sorting system as claimed in claim 13 wherein the force applied by the booster in the first direction is configured to ensure that an article crosses the roller-top conveyor belt.

21. The sorting system as claimed in claim 13 wherein the roller-top conveyor belt is stopped when an article destined to continue along the main conveyor line is crossing the roller-top conveyor belt.

22. The sorting system as claimed in claim 13 wherein the booster does not apply a force in the first direction against an article destined for the first or second destination.

* * * * *